United States Patent Office 3,274,854
Patented Sept. 27, 1966

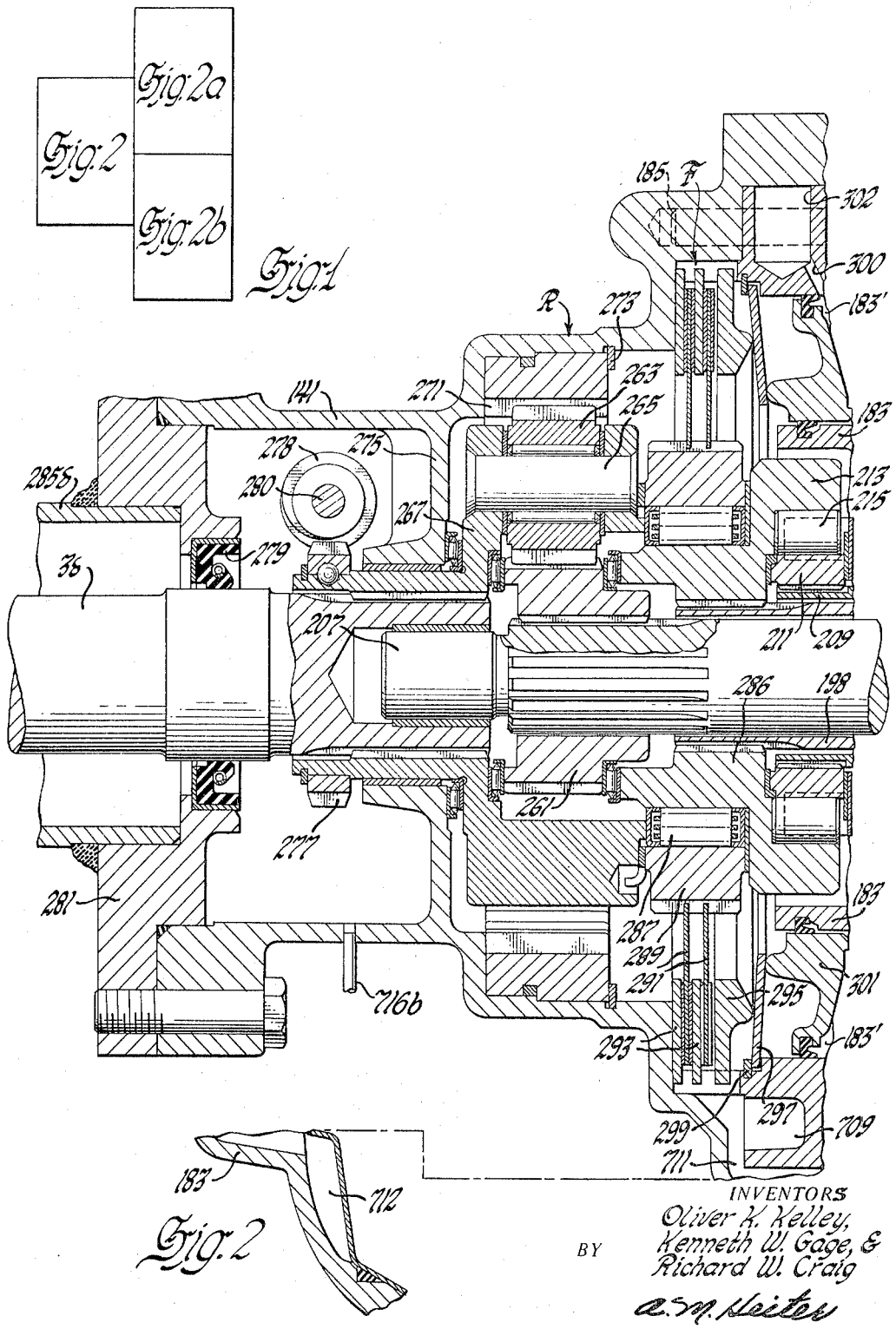

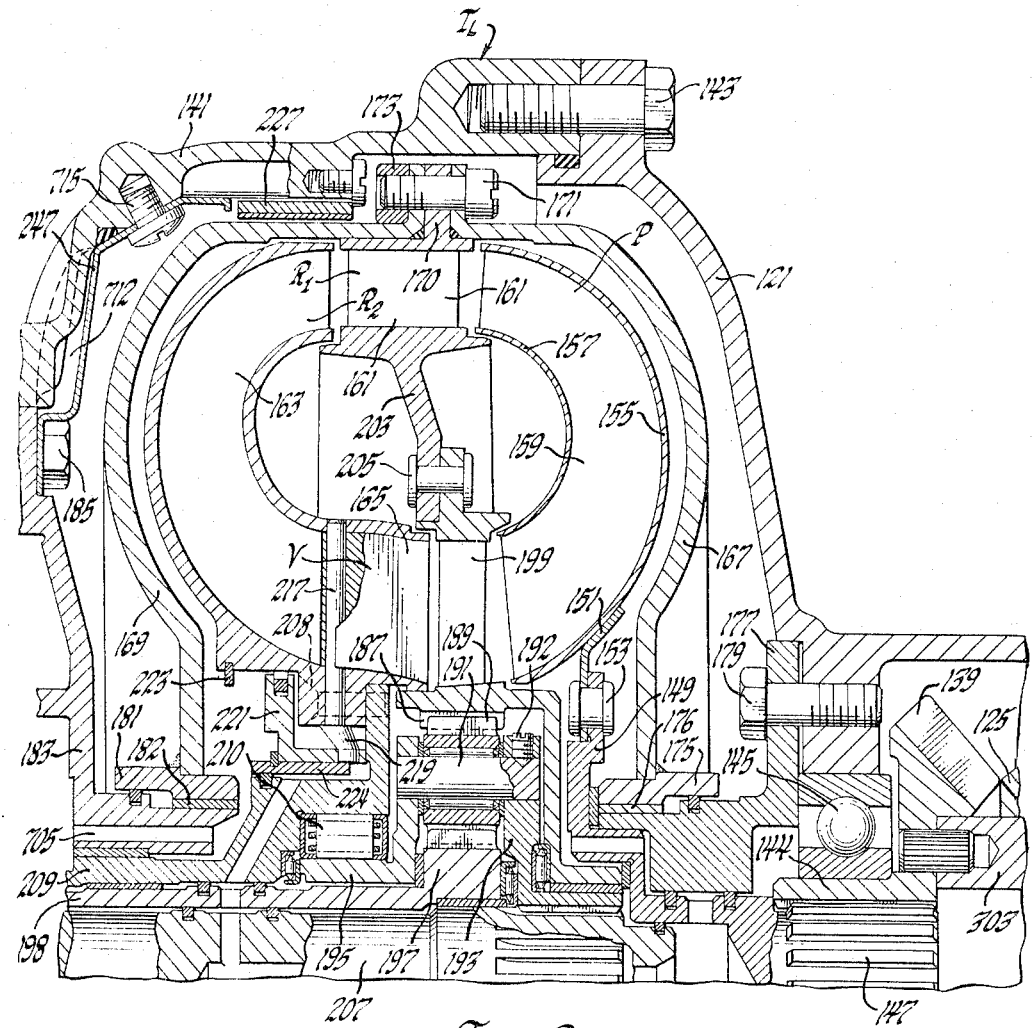

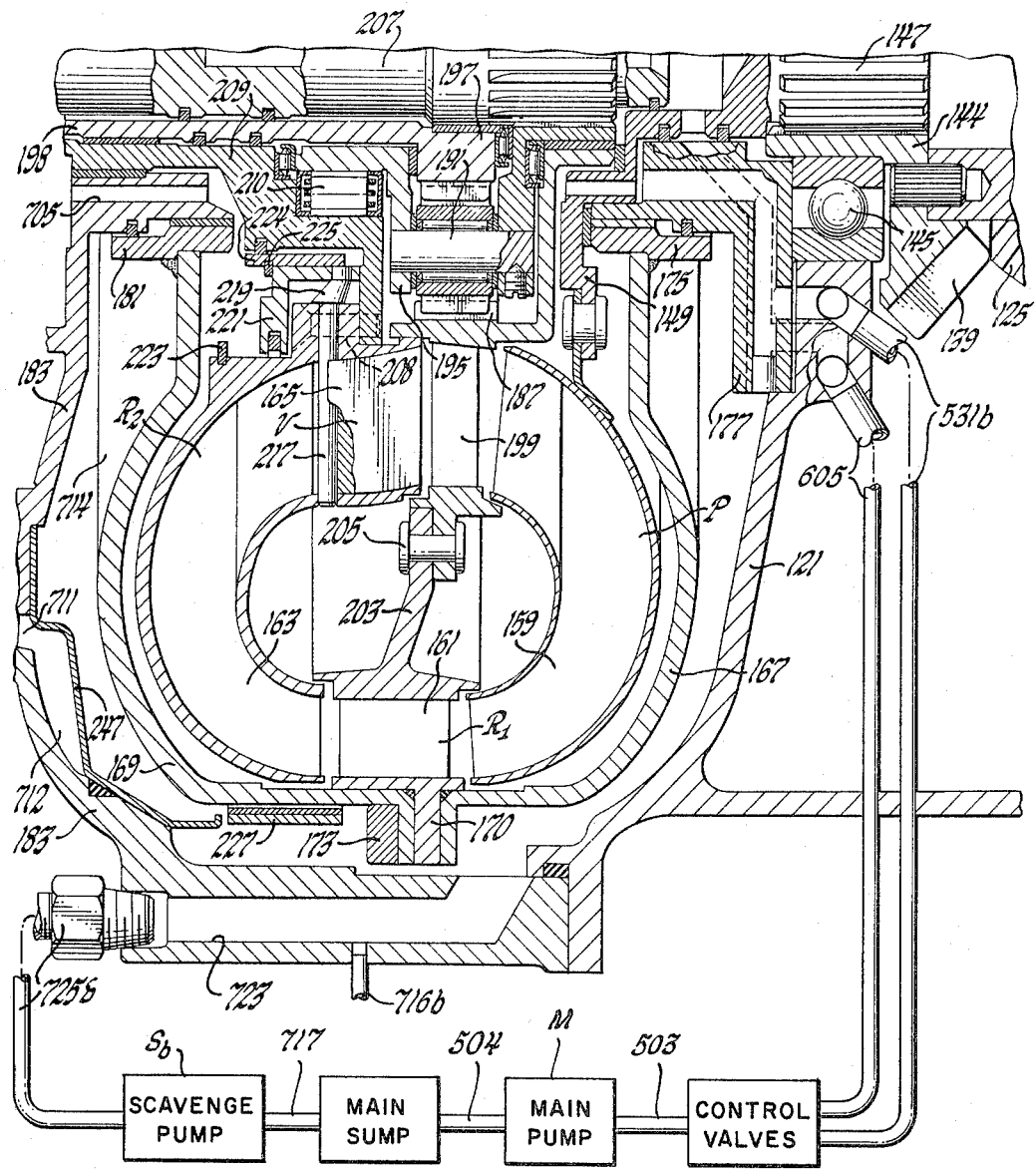

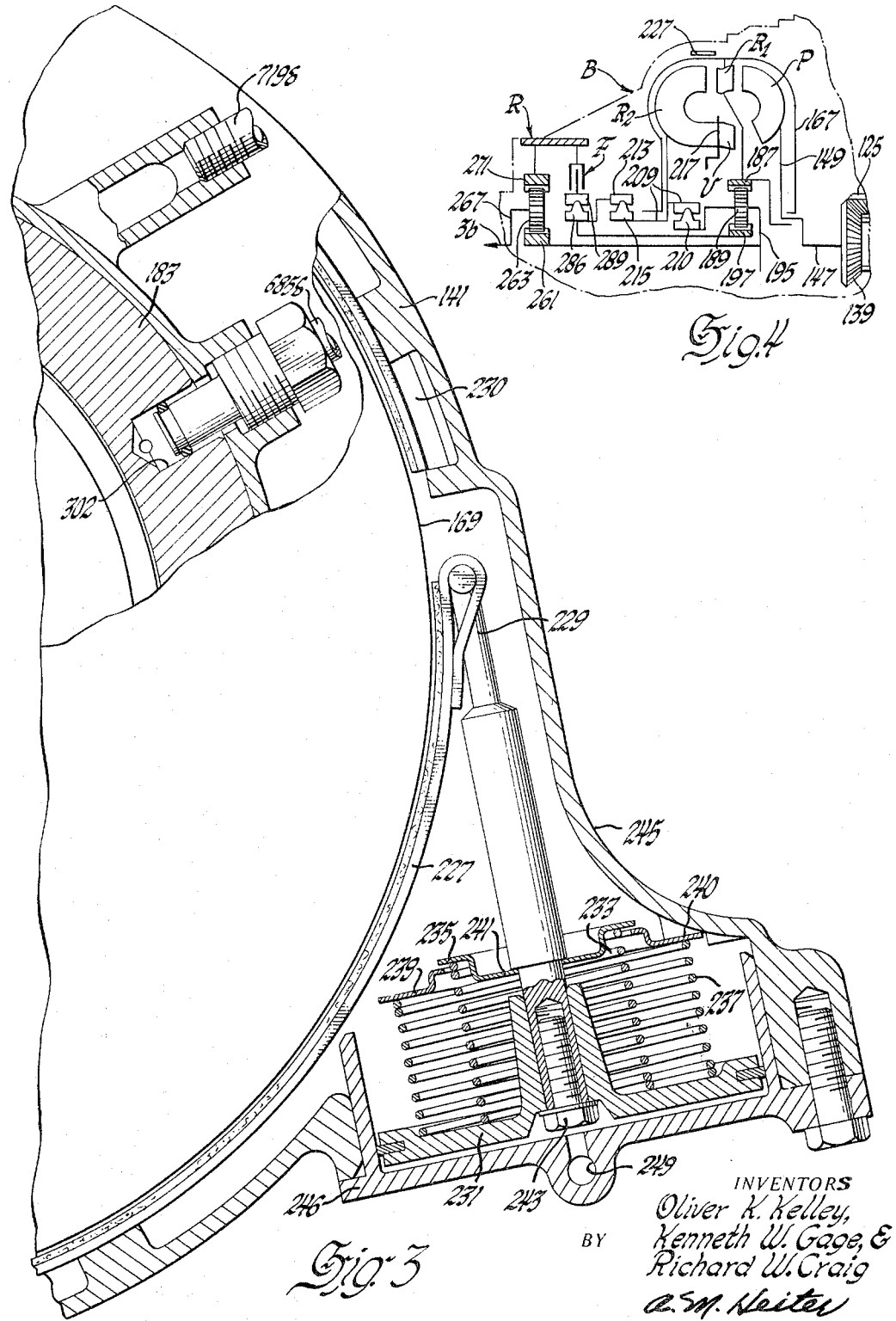

3,274,854
TRANSMISSION
Oliver K. Kelley, Bloomfield Hills, Kenneth W. Gage, Birmingham, and Richard W. Craig, Flint, Mich., assignors to General Motors Corporation, Detroit, Mich., a corporation of Delaware
Original application Jan. 7, 1959, Ser. No. 785,390, now Patent No. 3,170,534, dated Feb. 23, 1965. Divided and this application Oct. 16, 1964, Ser. No. 404,371
2 Claims. (Cl. 74—677)

This invention relates to transmissions and more particularly to transmissions employing a fluid drive and a gear unit, and is a division of the applicants' prior application Serial No. 785,390, filed January 7, 1959, now Patent 3,170,534.

In fluid drive transmissions having a gear unit and a brake to hold the reaction member of the gear unit, important advantages are obtained by employing a band in contact with the external dry surface of the rotating fluid drive housing and connecting this housing to the reaction member of the gear unit. In this arrangement the rotary fluid drive housing provides, due to the large volume of fluid therein and the high rate of circulation of fluid through the operating chamber therein, a brake drum that is cooled to a substantially constant temperature. Also, the rotary housing provides a high inertia element connected to the reaction member which substantially improves drive change characteristics.

This invention may be advantageously used in a torque converter having an input driven pump and a pair of runners. The first runner is mounted on the rotary torque converter housing and connected to the ring gear of the planetary gear set. The second runner is held against reverse rotation to establish one drive and may rotate forwardly and drive the carrier of the planetary gear set, which is connected to the output member. Since the sun gear is held against reverse rotation during torque converter drive and the first runner drives the ring gear, the carrier output is driven at a reduced ratio. In the coupling phase, both runners drive the carrier output. For reverse drive, a brake band engages the rotary torque converter housing to stop it, thus stopping the first runner, causing it to act as a stator, and the ring gear, causing it to act as a reaction gear, so the second runner will reversely drive, through the one-way devices, the sun gear in reverse direction to provide a reverse reduction drive.

An object of the invention is to provide in a fluid drive and gear unit transmission, a fluid drive unit having a rotary housing connected to rotate with a reaction gear of the drive change gear unit and a brake band engaging the external surface of the rotary housing to brake the reaction gear member.

Another object of the invention is to provide in a transmission having a torque converter and a ratio establishing gear unit a rotary housing having a runner and a reaction gear element fixed thereto, and a brake band engaging the external surface of the rotary housing to hold the runner and the reaction gear member.

These and other objects and advantages will be readily apparent from the following description and drawings which show an illustrated embodiment of the invention and in which:

FIG. 1 is a view showing how FIGS. 2, 2a and 2b are arranged to form a single large sectional view of the transmission unit.

FIG. 3 is a cross-sectional view showing portions of the reverse band and reverse servo.

FIG. 4 is a schematic view of the functional parts of the drive train.

The three element torque converter has an impeller and a pair of runners, each runner having two functions. The first runner functions as a multiplied torque turbine in forward drive, while the second runner initially acts as a hydraulic stator and subsequently as a direct drive turbine in forward drive. In reverse drive, the first runner is held to function as a stator reversing the direction of oil flow while the second runner functions as a reversely driven turbine. A simple planetary gear set in combination with three one-way devices and a friction brake is connected to the two runners to provide an infinitely variable gear ratio multiplication as well as a split torque combiner. The second runner in the torque converter has a variable angle exit portion that can be controlled to change the operation of the converter according to the performance desired by the vehicle operator. The planetary gear set of the transmission drives the final reduction planetary gear set. The output of the final reduction units drive the final output shaft.

The transmission unit B of the multiunit transmission of the above application S.N. 785,390, as shown in detail in FIGS. 2, 2a and 2b, is enclosed in an outer case member 141 which is secured to the center unit case 121 by bolts 143.

The input bevel gear 139 has a hub portion 144 that is splined on a torque converter input shaft 147 and which is rotatably supported in the center unit case 121 by ball bearing 145. The torque converter unit, generally designated $T_L$, includes an impeller assembly P having a driving and support ring 151 secured by rivets 153 to a flange 149 formed on the input shaft 147. The impeller P has an outer shroud 155 and an inner shroud 157. A plurality of vanes 159 are held in a spaced relationship by the shrouds 155 and 157.

The torque converter $T_L$ also includes a first runner $R_1$ having axial flow vanes 161 and a second runner $R_2$ having main radial flow vanes 163. The second runner $R_2$ has a variable axial flow exit portion V that includes vanes 165 pivotally mounted by crank pins 217 on the runner $R_2$. The three fluid elements P, $R_1$ and $R_2$ are enclosed by an outer shroud or shell composed of members 167 and 169. A ridge 170 formed as part of $R_1$ is held between shroud elements 167 and 169. The assembly of 167, 170 and 169 is secured together by bolts 171 threaded into a retaining ring 173. The shroud assembly is supported for rotation by a ring 175 welded or otherwise secured to the shroud member 167 and by a similar ring 181 secured to the shroud member 169. Ring 175 rotates on a bearing 176 surrounding a hub member 177 held by bolts 179 to the center case 121 and ring 181 rotates on a bearing member 182 surrounding a hub portion formed on a support member 183. The support 183 is secured by bolts 185 to the left unit case 141 (FIGS. 2 and 2a).

Enclosed within the torque converter $T_L$ is a planetary gear set having a ring gear member 187 meshing with a plurality of planet pinions 189 rotatably mounted on pinion shafts 191 secured by screws 192 to a planet carrier composed of a right hand member 193 and a left hand member 195. Also meshing with the planet pinions 189 is a sun gear 197 formed integral with a sleeve shaft 198. The flanged member 187 forming the ring gear has spokes 199 that lead into the "eye" of the torque converter and are connected by rivets 205 to an inward extending flange 203 formed integral with $R_1$.

The planet carrier member 193 is splined on an output shaft 207 and the second runner $R_2$ is secured by rivets 208 to a stepped sleeve shaft 209. Located between the second runner shaft 209 and the left hand carrier member 195 is a one-way clutch 210 shown as a sprag clutch, but which may be of any suitable form. The one-way device 210 allows the carrier member 195 to rotate faster in a forward direction than the second runner $R_2$ but allows the second runner to drive the carrier directly when $R_2$ rotates faster than the carrier. Splined to the second runner shaft 209 is the inner race 211 of another one-way device shown having rollers 215 and an outer race 213 in the form of a stepped cylinder internally splined to sleeve shaft 198, as shown in FIG. 2.

As mentioned above and referring in particular to FIG. 2a, the second runner variable exit vane portion V has vanes 165. These vanes 165 are each secured to a pin 217 that is offset at 219 to form a crank fitted into an annular piston member 221. The piston 221 is slidably mounted in the runner $R_2$ which has a stop ring 223 for limiting movement of piston 221 to the left as viewed in the figure. The piston 221 fits over a ring 224 slidably mounted on the second runner shaft 209 and held in place by a snap ring 225. It should be noted that piston 221 is exposed on one side to the converter oil pressure which biases the piston to the right as seen in the figure.

Surrounding the torque converter shroud member 169 is a reverse drive friction band 227 connected at one end to a movable rod 229 (FIG. 3) and at the other end by an anchor lug 230 located in a formed cavity in the outer case 141. The rod 229 is actuated by a reverse piston 231 acting through a spring 233 which bears on a seat 235 that engages a step 241 formed on the rod 229. The piston 231 moves against an outer reverse band release spring 237 that bears on one end against a retainer ring 239 in turn bearing against a surface 240 formed with a reverse servo housing 245 formed as part of the unit case member 141. Downward sliding movement of the piston 231 on the rod 229 by the spring 237 is limited by a bolt 243 threaded into the end of the rod 229. Piston 231 reciprocates within a combination cylinder and cover member 246 and is urged to apply the band 227 and wrap it on shroud member 169 by fluid pressure acting on the piston and supplied through a passage 249 formed in the cover 246.

Referring to FIG. 2, it will be seen that there is another planetary gear set generally designated R and which provides a final reduction in speed. This gear set R includes a sun gear 261 splined on the torque converter output shaft 207. Meshing with the sun gear 261 are planet pinions 263, only one of which is shown, journalled on pinion shafts 265 supported by a carrier member 267. A ring gear 271 also meshes with the planet pinions 263 and is secured to the housing 141 and held against axial movement by snap ring 273 and against rotation by any suitable means, such as a key, not shown. The carrier member 267 is rotatably supported in a hub 275 formed integral with the case member 141. The carrier 267 is splined on an axle or output shaft 3b. Secured on the outer surface of the carrier shaft 267 is a speedometer gear 277 that meshes with a worm gear 278 secured to drive a speedometer shaft 280. An oil seal 279 prevents leakage of oil from within the gear unit into an axle housing 285b which surrounds the axle shaft 3b and which is welded or otherwise secured to an end cover 281 bolted to the outer case 141.

The outer race 213 of the aforementioned freewheeler 215 is stepped to also form an inner race of a one-way sprag device 287 having an outer race 289 and an inner race 286 formed integral with race 213. Friction disks 291 are splined to the outer race 289 and are interposed between separation plates 293 and a pressure plate 295, all of which are splined to the stationary cylinder member 183. A Belleville spring 297 acts between the pressure plate 295 and an annular forward drive piston 301 slidably mounted in the stationary cylinder 183' in member 183. A snap ring 299 anchors one end of the Belleville spring 297 to provide a mechanical lever multiplication of force exerted by fluid pressure operated piston 301. The disks 291 and 293 form a forward drive reaction establishing device generally designated F. The forward drive piston 301 is actuated by oil under pressure introduced into cylinder 183 through a port 300 connected to a space 302 in turn connected to a conduit 685b (FIG. 3).

Referring to FIGS. 2, 2a and 2b it will be seen that converter oil at the converter static pressure will pass through a converter outlet passage 705 formed in the member 183 and will lubricate the one-way devices 211–213, 286–289 as well as splines, bearings and gears of the final reduction drive unit. This oil will collect in the bottom chamber 709 formed in member 183 from where it will pass through a drain passage 711 and into the annular space 712 formed between the support member 183 and the cooler cover plate 247. The cover plate 247 is secured to the case 141 by bolts 715. The space 712 has a substantial volume and oil in space 712 will be cooled by heat radiating from the cover plate 247 into an air stream created by fins 714 formed on the rotating shroud 167–169. Oil will fill the cooler space 712 and flow out at the top through a port, not shown.

Also shown in FIGURE 2b, lubrication oil from passage 705, that cools in the speedometer gear compartment formed by case 141, flange 275 and cover 281, is drained through an appropriate outlet into a pipe 716b which connects into the converter housing. Drain oil from the speedometer gear compartment, which exits through pipe 716b, and oil leaking out of the converter shroud 167 cools in a sump 723 connected by suction pipe 725b to a scavenge pump $S_b$. This pump pumps oil from the sump 723 to the main sump through a discharge pipe 717. Pipe 504 connects the main sump to the main pump and oil is pumped to the control valves illustrated. The control valves control oil passage into the converter feed line 531b and vane control passage, all disclosed and described in the U.S. Patent 3,170,534 referred to above.

The driving bevel gear 125 causes forward or counterclockwise rotation of gear 139 as viewed from the right side of the transmission or right side of FIGURE 4. Gear 139 drives the input shaft 147.

Forward drive of the impeller P causes the oil in the converter to circulate in a forward direction and impinge in the vanes of the first runner $R_1$ to drive it in a forward direction. This effects forward rotation of connected ring gear 187 of the torque converter planetary gear unit. During forward operation the reverse band 227 is disengaged. Initially oil leaving the vanes of $R_1$ is rotating in a rearward direction and impinges on the back side of the vanes of the second runner $R_2$ to urge it rearwardly. Such backward rotation is prevented by the combination of one-way devices 215–213, 287–289 and the forward drive friction unit F which is engaged by supplied fluid under pressure via line 685b and space 302 to cylinder 183'.

The one-way devices 215–213 and 287–289 are schematically shown as ratchet devices in FIG. 4. With the disk brake F, comprising disks 291 and 293 engaged, the outer element 289 is held stationary from rotation in either direction and the inner element 286, shown as a spade in FIG. 4, is prevented from reverse rotation. Outer element 213 being connected to element 286 is likewise prevented from reverse rotation so that the freewheel inner element 215 and connected runner $R_2$ cannot rotate rearwardly. With $R_2$ held against reverse rotation, its vanes turn the reversely rotating oil in a forward direction so that it enters the impeller P at an advantageous angle to produce an overall torque multiplication between the input to the impeller P and the first runner $R_1$. The forward drive brake F and one-way device 287, 289 also act to prevent reverse rotation of the sun gear 197 to cause the carrier 195 and sun gear 261 to rotate forward at a still lower speed than the ring gear 187 is driven.

The final reduction gear unit, including the input sun gear 261, stationary ring gear 271 and pinions 263 on carrier 267, provides a further constant ratio gear reduction corresponding to the conventional rear axle and differential gear reduction. Carrier 267 is connected to drive the left axle shaft 3b which is operatively connected to the left rear wheels. Similarly the carrier output of the right unit drives the right axle shaft, not shown, and right rear wheel.

*Torque converter operation*

As set forth in Patent 3,062,074, Gilbert K. Hause and Oliver K. Kelley, the hydraulic torque converter and its associated gear set automatically gradually changes from a hydraulic torque multiplication and gear multiplication drive to a gear multiplication drive only and finally to a substantially one-to-one ratio fluid coupling drive. As the speed of rotation of the first runner $R_1$ increases the oil leaving its vanes changes to a more forward direction until the oil acts on the vanes of $R_2$ to urge it forwardly. After reaching a speed equal to the speed of carrier 195, $R_2$ acts through the one-way device 209–210 and aids in driving the carrier 195 forwardly. During this time the one-way device 215–213 free wheels to allow forward rotation of the runner $R_2$. When $R_2$ is rotating at sufficient speed to directly drive the carrier 195 forward faster than it is being driven by the first runner $R_1$ acting through the ring gear 187, then the sun gear 197 will begin to rotate forwardly. Such forward rotation of the sun gear 197 is permitted by the one-way device 287–289. Eventually all of the torque from the input shaft 147 is transmitted to the runner $R_2$ and directly to the carrier 195 with the first runner $R_1$ rotating freely in the oil.

By varying the position of the variable exit vane portions V of the second runner $R_2$ the torque converter operation can be changed from coupling phase operation to torque multiplication phase operation and back again to coupling phase. By varying the vane angle, the amount of turning done on the oil when passing between the vanes of $R_2$ can be varied. This results in changes in the amount of torque absorption by the runner $R_2$. Furthermore, the attack angle of oil entering the impeller P will be changed. The change in torque absorbed by $R_2$ and the change in forward velocity of the oil entering the impeller together act to cause a change in hydraulic torque multiplication. If the variable vane portions 165 are set in the high angle position, the oil will be turned in an extreme forward direction for maximum torque multiplication. On the other hand, if the vanes are positioned in the low angle, the oil will have little or no forward momentum and at higher speeds of $R_2$, the oil leaving $R_2$ will have a considerable backward rotation component.

When the vane control passage 605 is connected to exhaust, the pressure in the converter moves piston 221 and crank 217 to pivot the vane elements 165 into the low angle position. This provides for the greatest coupling efficiency in the hydraulic unit and would be in effect during road load and coast conditions. During high angle drive, the torque converter changes from a torque converter phase to a coupling phase at a relatively low speed. This provides maximum efficiency and minimum fuel consumption.

For medium performance and acceleration, the vanes are located in an intermediate position. When converter pressure is connected to conduit 605 resulting in converter pressure acting on both sides of the vane control piston 221, the vane elements 165 are then free of the influence of piston 221 and will assume a position dependent on the speed of $R_2$ and the angle at which the oil impinges on the portions 165. If the oil leaving the main vane portions 163 of $R_2$ is moving parallel to these portions then the pivoted portions 165 will assume an intermediate position in line with vanes 163. If the oil is flowing in a forward direction the vanes 165 will be positioned more toward the low angle position, and if flowing reversely the vanes will assume a position toward the high angle position. This mid-angle range of operation provides for medium performance and torque multiplication up to a relatively high speed with a relatively high coupling efficiency at higher speeds.

When the high level main line pressure, which is higher than converter pressure, is connected to passage 605, it will act on piston 221 and move it against the converter pressure into the high angle. With the vanes in the high angle position the vanes of $R_2$ will turn the oil through a greater angle and into a more forward direction with a corresponding increase in rearward torque on the runner $R_2$. If the torque converter had formerly been in a coupling phase with $R_2$ rotating forward at almost the speed of the impeller P, then the reverse torque imposed on $R_2$ due to the angle change will tend to urge it reversely giving a torque multiplication phase operation of the converter.

Suitable controls to supply the vane control passage 605 as described above are shown in the above application Serial No. 785,390.

Referring again to the schematic representation in FIG. 4, it will be seen that engagement of the reverse band 227 holds the first runner $R_1$ from rotation as well as the ring gear 187. The vanes 161 of $R_1$ will act to turn the oil from the impeller P in a reverse direction and this reversely rotating oil will act on the vanes of $R_2$ to rotate it backward. Such backward rotation is possible because in reverse drive the forward brake F is disengaged so that no ground torque reaction is possible through the one-way devices 287–289 and 215–213. Reverse rotation of $R_2$ will cause the spade element 215 of one-way device 215–213 to drive the element 213 and connected spade element 286 reversely. This causes reverse rotation of sun gear 197 and because ring gear 187 is held by the reverse band 227, the carrier 195 is caused to rotate at a reduced speed and increased torque in a reverse direction. The one-way device 209–210 will freewheel at this time. The final reduction gear unit R will further reduce the speed and increase the torque of the reverse drive to the driving axle 3b and connected drive wheel.

During reverse operation, the vane control is effective as in forward drive. However, it could easily be modified to set the vanes in any desired fixed position when in reverse.

Since the brake band 227 engages a drum surface on external surface of the rotary torque converter housing 167–169, the drum is extremely well cooled due to the large volume of fluid in the operating chamber in the housing and the high rate of circulation of fluid through the operating chamber. Also, since the rotary housing is connected to the ring gear 187, an inertia mass rotating with the ring gear is provided which improves the shift characteristics.

Other modifications and changes will be apparent to those skilled in the art and can be made within the scope of the invention which is to be limited only by the following claims.

What is claimed is:

1. In a hydrodynamic torque transmitting unit including a plurality of rotating vane elements, a shroud member covering said elements connected to rotate with one of said elements and forming a torus chamber for working fluid, a source of fluid under pressure, means for supplying fluid under pressure into said torus chamber, a stationary housing surrounding said shroud member, a cover plate secured to said housing providing a fluid receiving annular space therebetween for cooling working fluid, means for transmitting working fluid from said torus chamber into said annular space, a sump for said unit, a scavenge pump connected to bottom of said sump to pump fluid therefrom and return it to said source.

2. In a transmission, a fixed housing, an input member, an output member mounted for rotation with respect to said fixed housing, a fluid drive having a pump connected to said input member, a runner, and a rotary housing within said fixed housing having a wall completely enclosing said pump and runner and providing a fluid operating chamber, a planetary gear unit having first, second and third elements, an element being connected to said rotary housing for rotation therewith, an element being connected to said output member, means for connecting said runner to an element, said rotary housing having a thin annular longitudinally extending wall portion of substantially uniform thickness at the outer perimeter providing an external brake drum surface and an internal cooling surface contacted by fluid circulating through said operating chamber to cool said external brake surface, means to supply fluid to said rotary housing at the inlet to said pump, exhaust means to exhaust fluid from said rotary housing, said pump circulating the fluid supplied to the inlet of said pump across said internal cooling surface and to said runner and to said exhaust means, means to maintain the space between said rotary housing and fixed housing free of fluid, annular brake means located in said space having friction means selectively engaging said brake drum surface to brake said rotary housing to retard rotation of an element of said planetary gear unit to establish a drive.

References Cited by the Examiner

UNITED STATES PATENTS

| | | | |
|---|---|---|---|
| 2,158,557 | 5/1939 | Van Lammeren | 74—677 |
| 2,185,491 | 1/1940 | Anderson et al. | 60—54 |
| 2,377,009 | 5/1945 | Heyer | 74—645 |
| 2,410,333 | 10/1946 | Barkeij | 74—645 |
| 2,414,359 | 1/1947 | Carnagua et al. | 74—677 |
| 2,570,889 | 10/1951 | Van Lammeren | 60—54 |
| 2,597,245 | 5/1952 | Kelbel. | |
| 2,608,880 | 9/1952 | Flinn. | |
| 2,632,539 | 3/1953 | Black | 60—54 X |
| 2,957,370 | 10/1960 | Kelley et al. | 74—677 |
| 3,009,368 | 11/1961 | De Lorean | 74—677 |
| 3,023,583 | 3/1962 | Mamo | 60—54 |
| 3,062,074 | 11/1962 | Hause et al. | 74—677 |
| 3,063,245 | 11/1962 | Rippy | 60—54 |
| 3,118,279 | 1/1964 | Goudy | 60—54 |
| 3,141,355 | 7/1964 | Gabriel | 74—677 |
| 3,150,541 | 9/1964 | Flinn | 74—677 |
| 3,152,446 | 10/1964 | Foerster | 60—54 |

DAVID J. WILLIAMOWSKY, *Primary Examiner.*
DON A. WAITE, *Examiner.*
M. H. FREEMAN, T. C. PERRY, *Assistant Examiners.*